(12) United States Patent
Mustafa

(10) Patent No.: US 7,725,466 B2
(45) Date of Patent: May 25, 2010

(54) HIGH ACCURACY DOCUMENT INFORMATION-ELEMENT VECTOR ENCODING SERVER

(76) Inventor: Tarique Mustafa, 1008, S De Anza Blvd., Apt. #J-204, San Jose, CA (US) 95129

( * ) Notice: Subject to any disclaimer, the term of this patent is extended or adjusted under 35 U.S.C. 154(b) by 394 days.

(21) Appl. No.: 11/977,318

(22) Filed: Oct. 23, 2007

(65) Prior Publication Data

US 2008/0097990 A1 Apr. 24, 2008

Related U.S. Application Data

(60) Provisional application No. 60/853,705, filed on Oct. 24, 2006.

(51) Int. Cl.
*G06F 7/00* (2006.01)
(52) U.S. Cl. .................... 707/729; 707/715; 707/739
(58) Field of Classification Search ............... 707/715, 707/729, 739
See application file for complete search history.

(56) References Cited

U.S. PATENT DOCUMENTS

| | | | | |
|---|---|---|---|---|
| 5,552,283 | A * | 9/1996 | Diamandis et al. ............ | 435/6 |
| 6,318,422 | B2 * | 11/2001 | Woratyla et al. ............ | 141/333 |
| 6,965,900 | B2 * | 11/2005 | Srinivasa et al. ............ | 707/102 |
| 7,027,974 | B1 * | 4/2006 | Busch et al. .................... | 707/4 |
| 7,403,938 | B2 * | 7/2008 | Harrison et al. ................ | 707/3 |
| 2002/0159542 | A1 * | 10/2002 | Kokkonen et al. .......... | 375/324 |
| 2002/0168664 | A1 * | 11/2002 | Murray et al. ................ | 702/20 |
| 2003/0065505 | A1 * | 4/2003 | Johnston et al. ................ | 704/9 |
| 2003/0069880 | A1 * | 4/2003 | Harrison et al. ................ | 707/3 |
| 2003/0115189 | A1 * | 6/2003 | Srinivasa et al. ............... | 707/3 |
| 2005/0055399 | A1 * | 3/2005 | Savchuk ..................... | 709/203 |
| 2006/0069512 | A1 * | 3/2006 | Rzhetsky et al. .............. | 702/19 |
| 2006/0155700 | A1 * | 7/2006 | Dejean et al. .................. | 707/6 |
| 2006/0167869 | A1 * | 7/2006 | Jones ............................. | 707/4 |
| 2007/0055662 | A1 * | 3/2007 | Edelman et al. ................ | 707/6 |
| 2007/0094166 | A1 * | 4/2007 | Addison ....................... | 706/13 |
| 2007/0271508 | A1 * | 11/2007 | Audet ........................ | 715/530 |

(Continued)

FOREIGN PATENT DOCUMENTS

EP 1 244 225 A2 * 3/2002

OTHER PUBLICATIONS

"Towards a Fuzzy Domain Ontology Extraction Method for Adaptive e-Learning"—Lau et al.—Jun. 2009 IEEE (p. 1-18).*

(Continued)

*Primary Examiner*—John E Breene
*Assistant Examiner*—Anh Ly
(74) *Attorney, Agent, or Firm*—Blakely, Sokoloff, Taylor & Zafman LLP

(57) ABSTRACT

Some embodiments of a high-accuracy document information element-vector (IE-vector) encoding server have been presented. In one embodiment, the high-accuracy document IE-vector encoding server applies finite state automaton (FSA) to parse a document to identify one or more information elements (IEs) in the document. Then a DNA sequence of the document is derived based on the one or more IEs. The concept of DNA sequence of a document is powerful and can be used in building automated tools such as computer based processes to automatically reason and search for similarity, dissimilarity, equivalence and other relationships between structured, semi-structured and unstructured data and information. The DNA sequence of a document provides powerful paradigm to build sophisticated information and data search and retrieval techniques and tools.

12 Claims, 6 Drawing Sheets

U.S. PATENT DOCUMENTS

| | | | |
|---|---|---|---|
| 2008/0071779 A1* | 3/2008 | Mammen et al. | 707/6 |
| 2008/0071781 A1* | 3/2008 | Ninan et al. | 707/6 |
| 2008/0071822 A1* | 3/2008 | Audet et al. | 707/102 |
| 2008/0072169 A1* | 3/2008 | Audet et al. | 715/764 |
| 2008/0097990 A1* | 4/2008 | Mustafa | 707/5 |
| 2009/0012958 A1* | 1/2009 | Raj | 707/6 |
| 2009/0204374 A1* | 8/2009 | Hill et al. | 703/2 |

OTHER PUBLICATIONS

Yang Li—"Building an intelligent filtering system using idea indexing"—University of North texas—Aug. 2003 (pp. 1-71).*

John Clark and Bruce Whitelaw—"A future for transgenic livestock"—Nature reviews/Genetics vol. 4, Oct. 2003 (pp. 825-833).*

PCT International Search Report PCT/US07/22578 mailed Apr. 8, 2008 (2 pages).

PCT Written Opinion PCT/US07/22578 mailed Apr. 8, 2008 (6 pages).

Mironova, S., "Integrating Network Storage into Information Retrieval Applications," Thesis, University of Tennessee, Knoxville, May 2003 [retrived Feb. 27, 2008]. Retrieved from the Internet: <URL: http://www.cs.utk.edu/~mironova/thesis/Thesis.pdf> p. 14, para 2, p. 17, para 2.

International Preliminary Report on Patentability dated May 7, 2009 for corresponding PCT application PCT/US07/22578, filed Oct. 24, 2007, 7 pages.

Mironova, Svetlana, "Integrating Network Storage into Information Retrieval Applications", Thesis presentation, University of Tennessee at Knoxville, Apr. 8, 2003, 29 pages.

* cited by examiner

HIGH ACCURACY DOCUMENT INFORMATION-ELEMENT VECTOR ENCODING SERVER

RELATED APPLICATION

This application claims the benefit of U.S. Provisional Application No. 60/853,705, filed Oct. 24, 2006, which is incorporated herein by reference.

TECHNICAL FIELD

Embodiments of the present invention relate to encoding information, and more specifically to encoding information using information-element vectors.

BACKGROUND

Protection of data has been a challenging task because data may be embedded in any kind of files, such as word processing document, memorandum, electronic mail, spreadsheet, etc. Further more, data may be stored as structured data, such as in databases (where the data may be logically organized into columns and/or rows), and/or unstructured data, such as in a word processing document. It is difficult to process knowledge in unstructured data on which intelligent queries can be applied. This is because most queries and operations are currently limited to applications in which knowledge or information is represented or organized in structured data in regular expressions, such as credit card information, telephone number, and/or social security number, etc. In contrast, most conventional queries are inapplicable to unstructured data.

Due to the lack of concise and compact representation of unstructured data, it is difficult to run queries (such as searches) or perform operations on unstructured data, not to mention complex analysis of unstructured data. Since many applications, especially applications in the field of data security (e.g., data intrusion prevention, data extrusion prevention, etc.), rely on complex analysis of data, thus, a concise and compact representation of unstructured data is important for successful data security policy implementation.

DESCRIPTION OF THE DRAWINGS

The present invention is illustrated by way of example, and not by way of limitation, in the figures of the accompanying drawings and in which.

DETAILED DESCRIPTION

Figure 1:
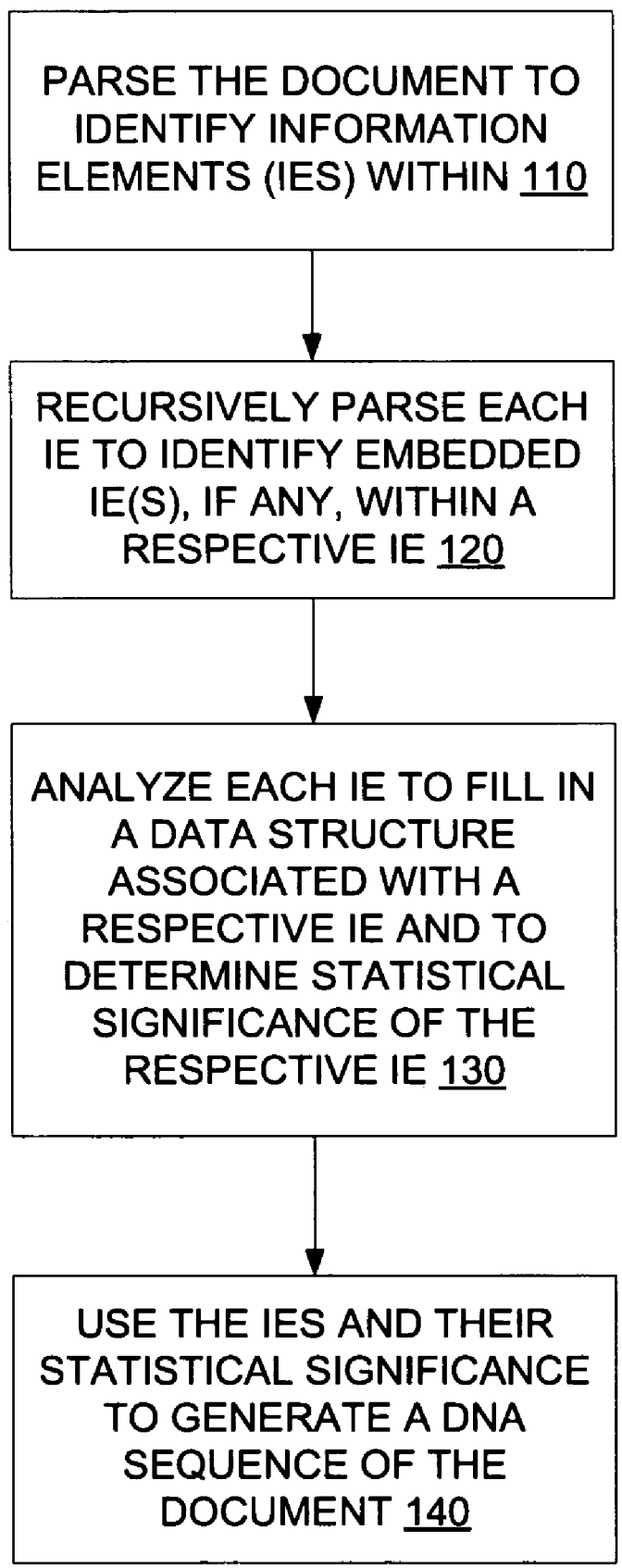
FIG. 1 illustrates a flow diagram of one embodiment of a process to encode information.

Described herein are some embodiments of a high-accuracy document information element-vector (IE-vector) encoding server. In some embodiments, the high-accuracy document IE-vector encoding server applies finite state automaton (FSA) to parse a document to identify one or more information elements (IEs) in the document. Then an identifier of the document, which is also referred to herein as a DNA (DeoxyriboNucleic Acid) sequence of the document, is derived based on the one or more IEs. This sequence identifying the document is analogized to the DNA sequence in biology because the components of this sequence (i.e., the IEs) contain characteristics of the document, which may be passed onto another document derived from the subject document. A document as used herein generally refers to a collection of information electronically stored as a single entity on a computer-readable medium. Details of a computer-readable medium are discussed below. For example, a document may be a binary file, a text file, or a combination thereof, such as a word processor file, a data file, a spreadsheet, a workbook, an image, a drawing, a webpage, etc. A document may be linked to one or more other documents, such as via a hyperlink. A document may be coded in various languages, such as a markup language (e.g. hypertext markup language (HTML) or extensible markup language (XML)), a scripting language (e.g. JavaScript, Active Server Pages (ASP), or Perl), etc. Furthermore, a document may reside on one or more computer systems, and/or may be accessed by one or more computer systems via a network, e.g., an Intranet, the Internet, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

To encode data, which may include structured and/or unstructured data, the concept of information elements (IEs) is used. In general, IEs are basic building blocks in canonical form that encapsulate information and/or data. In other words, an IE may lose its information content if it is further broken down. Each IE has a set of unique semantic and structural characteristics that differentiate the IE from another IE.

In some embodiments, multiple IEs may be combined to form a composite IE. The IEs that form the composite IE are herein referred to as constituent IEs. In other words, a composite IE may be broken down into multiple constituent IEs. Further, the composite IE may retain or inherit the characteristics of its constituent IEs.

In some embodiments, there are twelve basic types of IEs, which are summarized in Table 1 below. A data structure or data schema is defined for each type of IEs. The data structures (also referred to as data schema) of the twelve basic types of IEs are also summarized in Table 1 below. Note that more or fewer basic types of IEs may be defined in other embodiments. Furthermore, different data structures may be defined for the IEs in different embodiments.

TABLE 1

One embodiment of a set of IEs

| IE | Symbol | Data Structure |
|---|---|---|
| Free text | T | Word Set (non-stop words only) |
| | | Word Count ($w_c$) |
| | | Word Frequency ($w_f$) |
| | | Additional information, if available |
| Table | t | Table title |
| | | Number of columns ($C_n$) |
| | | Number of Rows ($R_n$) |
| | | (ColumnName, Position) |
| | | (RowName, Position) |
| | | {(Field value, Column No., Row No.), . . .} |
| Spreadsheet | S | Spreadsheet title |
| | | Number of columns ($C_n$) |
| | | Number of Rows ($R_n$) |
| | | {(ColumnName, Position, Formula) . . .} |
| | | (RowName, Position) |
| | | {(Field value, Column No., Row No.), . . .} |
| Figure | F | Figure title |
| | | Figure type |
| | | Figure frame |
| Image | I | Image title |
| | | Image format (e.g., gif, jpeg, bmp, etc.) |
| | | Image frame |

TABLE 1-continued

One embodiment of a set of IEs

| IE | Symbol | Data Structure |
|---|---|---|
| Field | f | Field name |
| | | Field type (e.g., data type) |
| | | Field value |
| | | Field formula |
| | | Field links |
| Header | η | No. of header fields (HFn) |
| | | {(Header value, field no.) . . .} |
| Footer | φ | No. of footer fields (FFn) |
| | | {(Footer value, field no.) . . .} |
| Footnote | ω | No. of footer fields (FFn) |
| | | {(Footnote value, field no.) . . .} |
| Index | i | Word set (Non-stop words only) |
| | | Word count ($w_c$) |
| | | Word frequency ($w_f$) |
| | | Additional information, if available |
| Glossary | γ | Word set (non-stop words) |
| | | Word count ($w_c$) |
| | | Word frequency ($w_f$) |
| | | Additional information, if available |
| Table of content | τ | Word set set (non-stop words) |
| | | Word count ($w_c$) |
| | | Word frequency ($w_f$) |
| | | Additional information, if available |

As mentioned above, IEs may be combined to build composite IEs. Note that IEs may be combined in various ways, such as concatenation, union, addition, subtraction, insertion (i.e., embedding), derivation, etc. In some embodiments, each document is represented as a composite IE. In other words, the document may be represented by, or encoded into, a sequence of one or more IEs. Details of one embodiment of a process to encode a document are discussed below.

FIG. 1 illustrates a flow diagram of one embodiment of a process to encode information contained in a document. In some embodiments, this process is also referred to as finite state automaton (FSA). The process may be performed by processing logic that may comprise hardware (e.g., circuitry, dedicated logic, programmable logic, microcode, etc.), software (such as instructions run on a processing device), firmware, or a combination thereof.

Referring to FIG. 1, processing logic parses the document to identify IEs within the document (processing block 110). Examples of various types of IEs have been discussed above. Further, processing logic may recursively parse each IE to identify embedded IE(s), if any, within a respective IE (processing block 120). Processing logic analyzes each IE identified to fill in the data structure of a respective IE and determine the statistical significance of the respective IE (processing block 130). Finally, processing logic uses the IEs identified and their statistical significance to generate a DNA sequence of the document (processing block 140).

Note that in other embodiments, processing logic may perform the operations described above in a different order. Furthermore, processing logic may perform more or fewer operations than those illustrated in FIG. 1 in some embodiments. To further illustrate the above process, details of one example are discussed below with reference to FIGS. 2A and 2B.

Figure 2A:
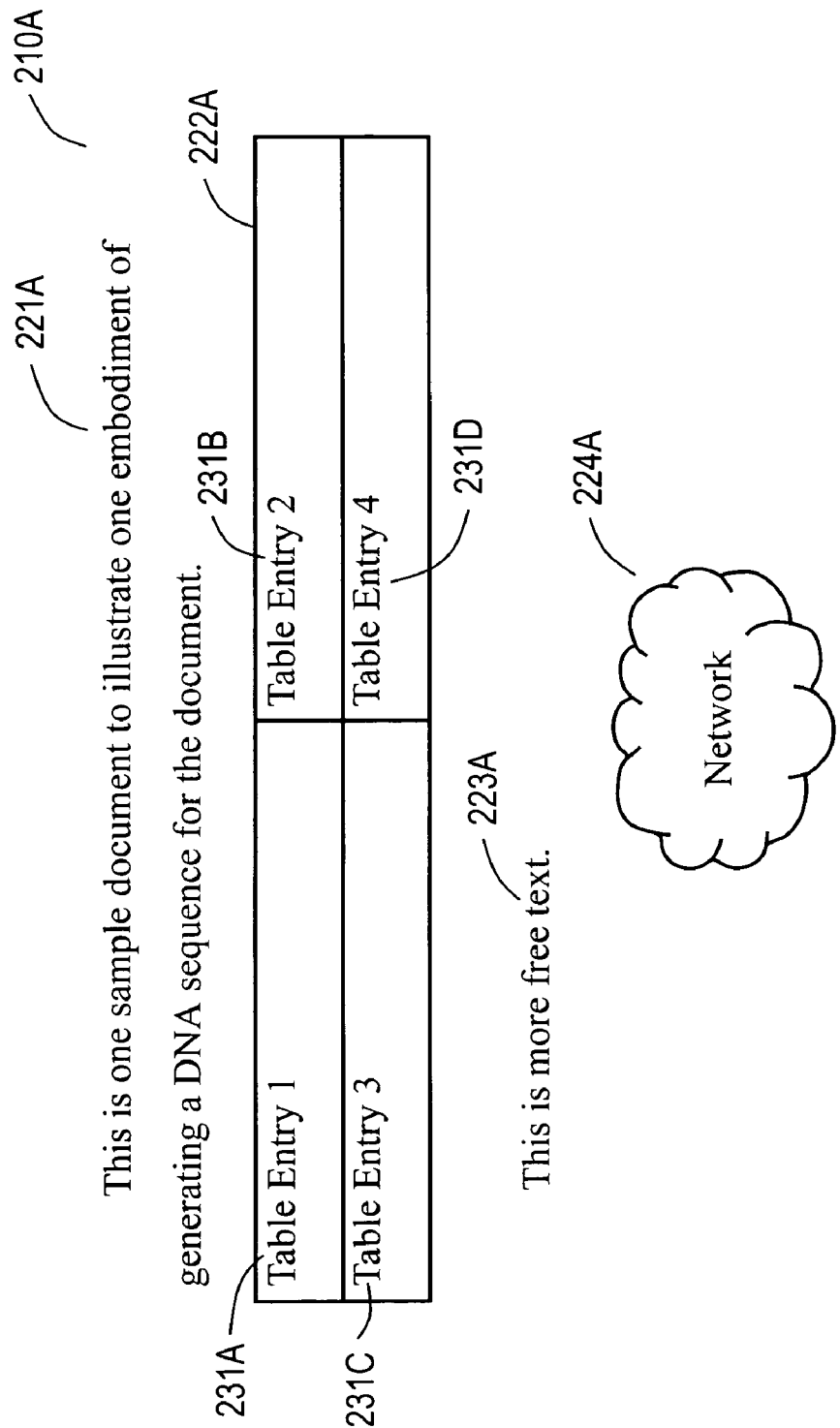
FIG. 2A illustrates one exemplary document.
Figure 2B:
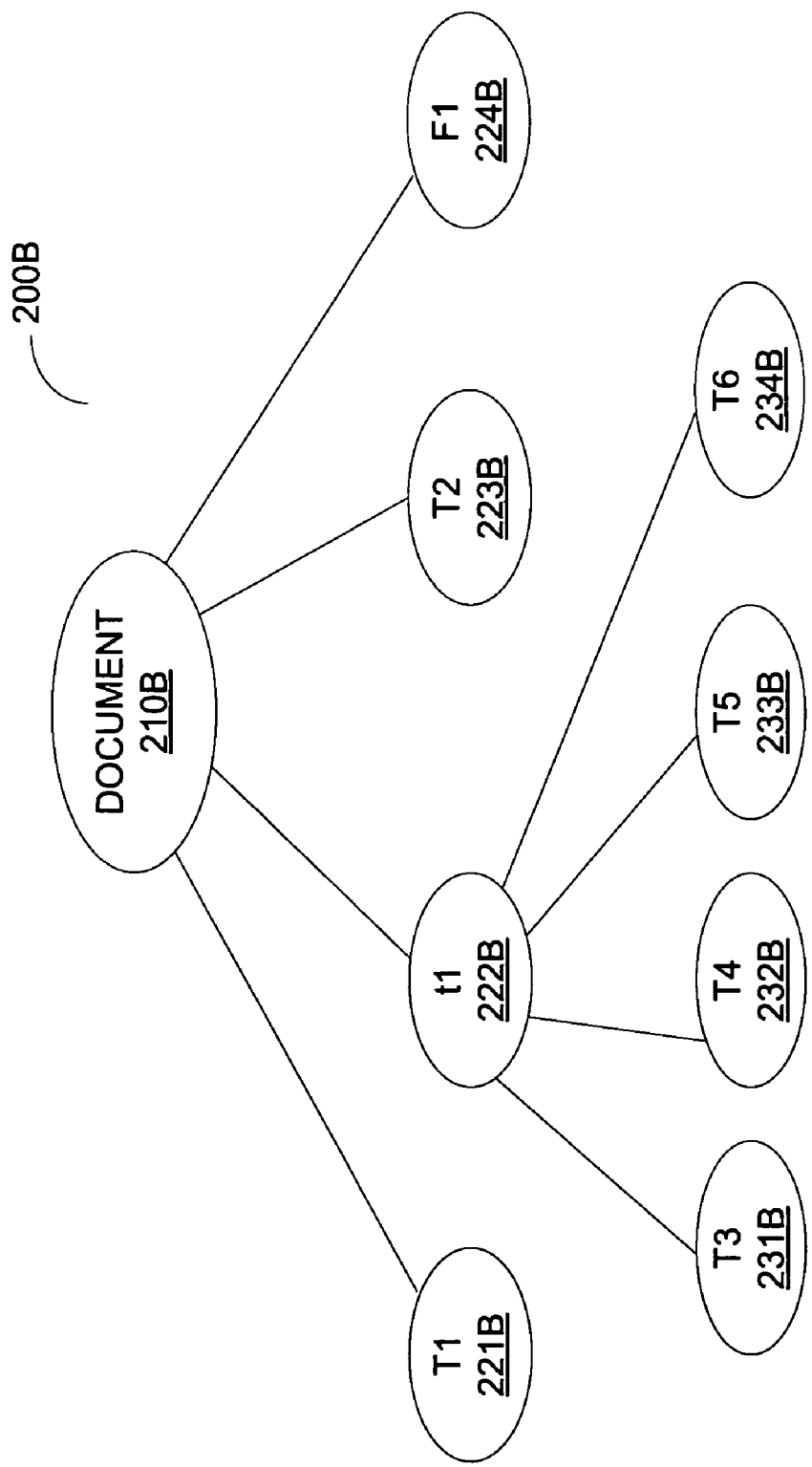
FIG. 2B illustrates one exemplary information-element (IE) map.

FIG. 2A illustrates one exemplary document 210A and FIG. 2B illustrates one exemplary information-element (IE) map corresponding to the document 210A. The document 210A in FIG. 2A has four IEs, namely, free text 221A, table 222A, free text 223A, and FIG. 224A. Within the table 222A, there are four entries 231A-231D, each of which contains more free text. In other words, the free text 231A-231D embedded within the table 222A.

To encode the information contained in the document 210A, processing logic first creates a root node 210B corresponding to the document 210A. Then processing logic parses the document 210A to identify the four IEs, i.e., free text 221A, table 222A, free text 223A, and FIG. 224A. Each of the four IEs 221A-224A may be represented as a node in a graph. For example, referring to FIG. 2B, the IE map 210B, which is a graph corresponding to the document 210A, has four nodes 221B-224B representing the four IEs 221A-224A. Each node is named using a corresponding symbol according to the definitions in Table 1 above. For instance, the node 221B representing the IE 221A (which is free text) is named as "T1," the node 222B representing the IE 222B (which is a table) is named as "t1," the node 223B representing the IE 223A (which is free text) is named as "T2," and the node 224B representing the IE 224A (which is a figure) is named as "F1."

After identifying the four IEs 221A-224A, processing logic may create the four nodes 221B-224B. Processing logic may further examine the content in each of the four IEs 221A-224A to fill in the corresponding data structures of the four IEs 221A-224A. The corresponding data structures are stored in the four nodes 221B-224B.

In some embodiments, processing logic may recursively perform the above operation to further examine each of the four IEs 221A-224A to discover any embedded IEs within the four IEs 221A-224A. For instance, processing logic examines the IE 221A, which is free text. After determining that there is no embedded IEs within the IE 221A, processing logic moves onto the next IE 222A. The IE 222A is a table having four entries 231A-234A. Each of the four entries 231A-234A is free text. Thus, processing logic creates four child nodes 231B-234B for the node representing the table 222A, i.e., node 222B. The four child nodes 231B-234B are named as T3, T4, T5, and T6, respectively. Processing logic further examines the free text in each of the four entries 231A-234A to fill in the corresponding data structures of the four entries 231A-234A (i.e., data structures defined for free text). For instance, processing logic may determine values of parameters related to the free text (e.g., word count, word frequencies of words occurring in each of the four entries 231A-234A, etc.) and fill in the corresponding data structures with these values. The corresponding data structures are stored in the four nodes 231B-234B. Since the four entries 231A-234A do not contain any embedded IEs, processing logic moves onto the IE 223A corresponding to the next node on the previous level, i.e., node 223B. After determining that there is no embedded IEs within the IE 223A, processing logic moves onto the next IE 224A. Since IE 224A does not have any embedded IEs, the process ends. Note that the resulting graph 200B, which is also referred to as an IE-map, identified by the root node 210B represents the document 210A by encoding the information of the document 210A in the nodes and branches (i.e., connections between the nodes) of the graph 200B.

To create a DNA sequence for the document 210A, processing logic may generate a sequence based on the content of the data structures of the IEs within the document (i.e., IEs 221A-224A and 231A-234A). For example, processing logic may concatenate the content of the data structures of the IEs to generate the sequence. In some embodiments, processing logic defines a set of algebra-based operators (e.g., Kleene closure), which reduce the sequence into a canonical form. In other words, by going through the content of the IEs (e.g., free text, table, etc.), processing logic may reduce it to a canonical form. Note that various types of IEs essentially include words (e.g., text in a footer or header, captions of images, titles of figures, etc.), and thus, processing logic may apply second set of statistical analysis to the words in the IEs to determine the corresponding statistical significance, such as, term frequency inverted document frequency (TFIDF), to determine the statistical significance of various words occurring in the sequence. As such, the IEs may be reduced to a sequence of symbols and/or numbers, which is the DNA of the document 210A.

Furthermore, processing logic may further reduce the size of the sequence by applying reduced concept space (RCS) to the sequence. In some embodiments, the words in the sequence initially generated as described above are defined as a domain specific word set ($\Omega_d$). Processing logic may further define a polysemic map of the domain specific word set ($\Omega_p$). Likewise, processing logic define a synonemic map of the domain specific word set ($\Omega_s$). Note that synonymy generally means two words having the same meaning, while polysemy generally means one word having multiple meaning. Processing logic may further define a nominal word set ($\Omega_n$). Then processing logic may apply polysemy resolution to $\Omega_d$ to generate a second word set $\Omega_{d'}$. Likewise, processing logic may apply synonemy resolution to $\Omega_d$ to generate a second word set $\Omega_{d''}$. Then processing logic may generate a reduced concept space (RCS) word set $\Omega$ by applying union to $\Omega_{d''}$ and $\Omega_n$, i.e., $\Omega=\Omega_{d''} \cup \Omega_n$. Each word in the RCS word set $\Omega$ is a dimension in the RCS. For an n-sized $\Omega$, there are n-dimensions in the RCS. Each point in the RCS represents a reduced concept vector (RCV). A RCV may be defined as:

RCV:=$\Sigma nXi$, for all (i$\in$N, n$\in$N), where Xi is the i-th dimension of the RCS and n is the magnitude (or projection) on the i-th dimension. For example, an exemplary RCV may be represented as follows:

$$RCV = aX1 + bX2 + cX3 + \ldots mXn.$$

In another example, if the RCV of some free text, T, is RCV=$5X_5+4X_{21}+3X_{26}$, then the IE DNA code is $T(5X_5 4X_{21} 3X_{26})$. For a document with 2 IEs of type free text, $T_1$ and $T_2$, suppose the RCV for $T_1$ is $5X_5+4X_{21}+3X_{26}$ and the RCV for $T_2$ is $15X_{11}+32X_{21}+9X_{116}$. Then the DNA sequence of the document is: $T_1(5X_5 4X_{21} 3X_{26}) T_2(15X_{11} 32X_{21} 9X_{116})$.

For a given RCS word set $\Omega$ with N dimensions, each word $\omega$ in $\Omega$ represents a Dimension Xi (where i$\in$N) in the RCS for a given IE. If a word $\omega$ occurs n-times in a sample IE, then n is the coefficient for the corresponding Dimension Xi (where i$\in$N). Thus, the word $\omega$ is mapped onto the Dimension Xi (where i$\in$N) and n (which is the number of times $\omega$ occurs in a given IE) is the magnitude of the vector component along the corresponding Dimension Xi. Furthermore, nXi may be defined as nXi=RCV.cos $\theta$, for all (i$\in$N, n$\in$N). Also, for a given IE, n is defined as the word count, i.e., n:=$w_c$.

In some embodiments, each IE type has a corresponding DNA code. DNA codes are derived from the corresponding metadata of the IE. A DNA code of a composite IE is the "ordered" combination of the DNA codes of the constituent IEs. Furthermore, the DNA encoding may be based on Latent Semantic Indexing (LSI) and Conceptual Indexing (CI) techniques, where additional elements included form the corresponding IE metadata. To simplify the DNA encoding, the above RCS technique discussed may be applied.

The concept of DNA sequence of a document is powerful and can be used in building automated tools, such as computer-based processes to automatically reason and search for similarity, dissimilarity, equivalence and/or other relationships between structured, semi-structured and unstructured data and/or information. The DNA sequence of a document provides powerful paradigm to build sophisticated information and data search and retrieval techniques and tools.

In some embodiments, variants of RCV are provided to enrich the paradigm. For example, semantics may be assigned to the dimensions in $\Omega$, functions and operators may be assigned to the dimensions in $\Omega$, etc. In some embodiments, security based semantics may be assigned to RCV in applications for data extrusion prevention.

To assign security based semantics to RCV, a security parameter index (SPI) may be defined as H, which is a security factor for an IE. For each word $\omega j$ in the RCV word set $\Omega$, there is a corresponding SPI coefficient $\eta_i$. The SPI coefficient $\eta_i$ can be as simple as an empirically determined number or a more complex derived formula.

For each IE type, there is a corresponding process to calculate SPI. For instance, for the SPI of free text intensive IE types (e.g., free text, header, footer, footnote, index, glossary, table of content, etc.), their corresponding SPIs are calculated based upon the LSI and/or CI techniques. For other IE types (e.g., table, spreadsheet, figures, images, fields, etc.), their corresponding IEs are calculated based upon combination of CI, RegEx and/or keyword correlation techniques. For each word $\omega_j$ in the RCV word set $\Omega$, the corresponding SPI coefficient $\eta_i$ may differ in value based upon the IE type. For example, suppose the SPI coefficient of the word $\omega_i$ "Confidential" and IE type of free text is $\eta_i$, and the SPI coefficient of the word $\omega_k$ "Confidential" and IE type of footer and/or header is $\eta_k$. Then $\eta_k$ may be significantly larger than $\eta_i$ because the document having a footer and header containing the word "Confidential" is more likely to be a confidential document than the other document having "Confidential" in its free text content.

To determine the SPI factor for a document, processing logic may simply assign the highest security coefficient among all the security coefficients of the IEs within the document. Alternatively, processing logic may compute the SPI factor for the document as a function of all the constituent IEs' security coefficients.

In some embodiments, the DNA sequences of documents may be used to determine if two documents are substantially similar by DNA sequence matching. Since the DNA sequence of a document carries substantially the characteristics of the constituent IEs of the document, using DNA sequence matching to determine the similarity between documents may overcome attempts to disguise similarity of two documents by re-ordering content, rewording, etc.

Figure 3A:
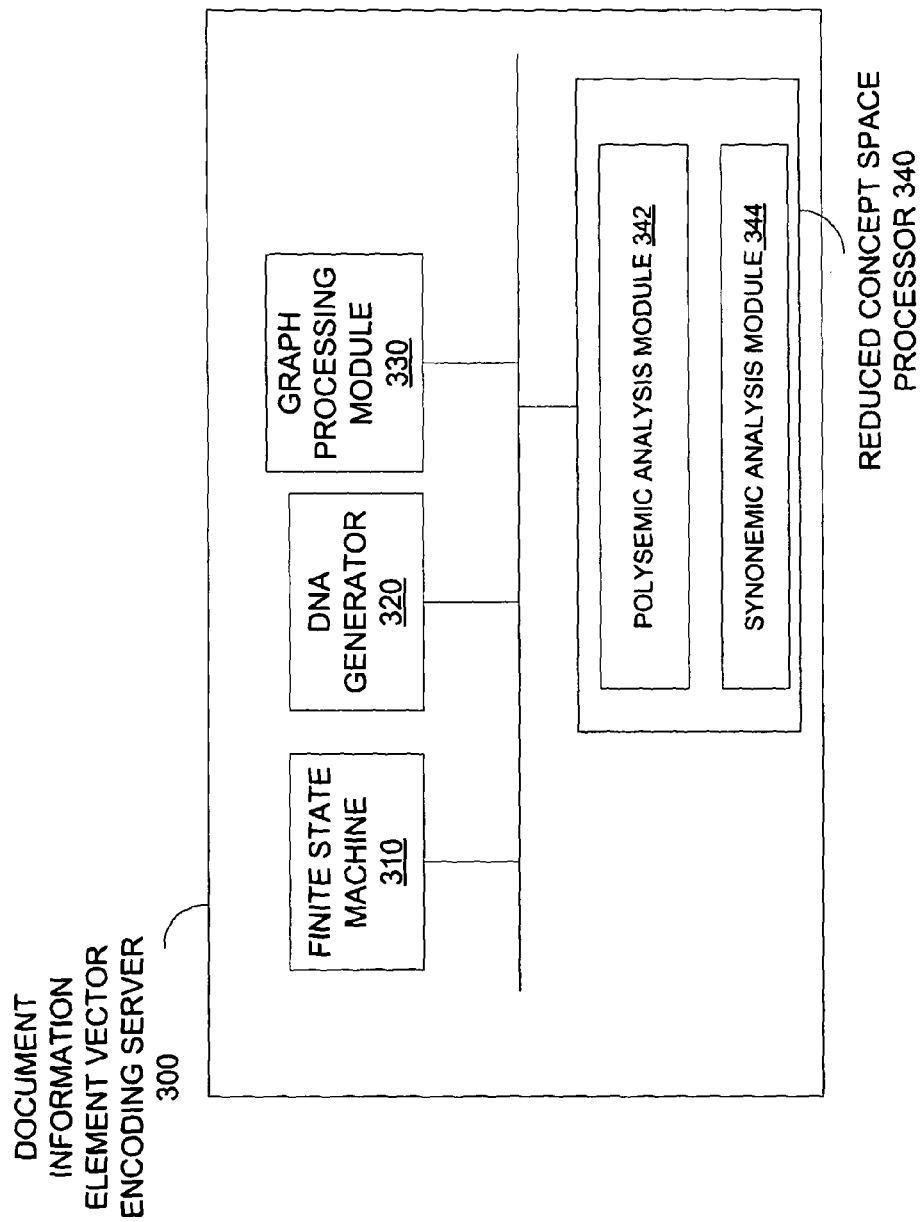
FIG. 3A illustrates a block diagram of one embodiment of a high-accuracy document information element-vector (IE-vector) encoding server.

FIG. 3A illustrates a block diagram of one embodiment of a high-accuracy document information element-vector (IE-vector) encoding server. The document IE-vector encoding server 300 includes a finite state machine 310, a DNA generator 320, a graph processing module 330, and a reduced concept space (RCS) processor 340, which are operatively coupled to each other. The RCS processor 340 further includes a polysemic analysis module 342 and a synonemic analysis module 344.

In some embodiments, the finite state machine 310 parses a document (such as the one shown in FIG. 2A) to identify one or more IEs in the document. The finite state machine 310 may recursively analyze each of the one or more IEs to identify one or more embedded IEs within a corresponding IE. The graph processing module 330 may create a graph, also referred to as an IE-map, to graphically represent the document based on the one or more IEs. One example of the IE-map is shown in FIG. 2B.

The DNA generator 320 derives a DNA sequence of the document based on the one or more IEs. Details of some embodiments of the process to generate the DNA sequence have been discussed above. In some embodiments, the DNA sequence generated may be reduced or simplified using the RCS processor 340. The polysemic analysis module 342 and the synonemic analysis module 344 may analyze the IEs to identify polysemic words and synonymic words, respectively, and simplify the DNA sequence accordingly. Details of some embodiments of the RCS analysis have been discussed above.

Figure 3B:
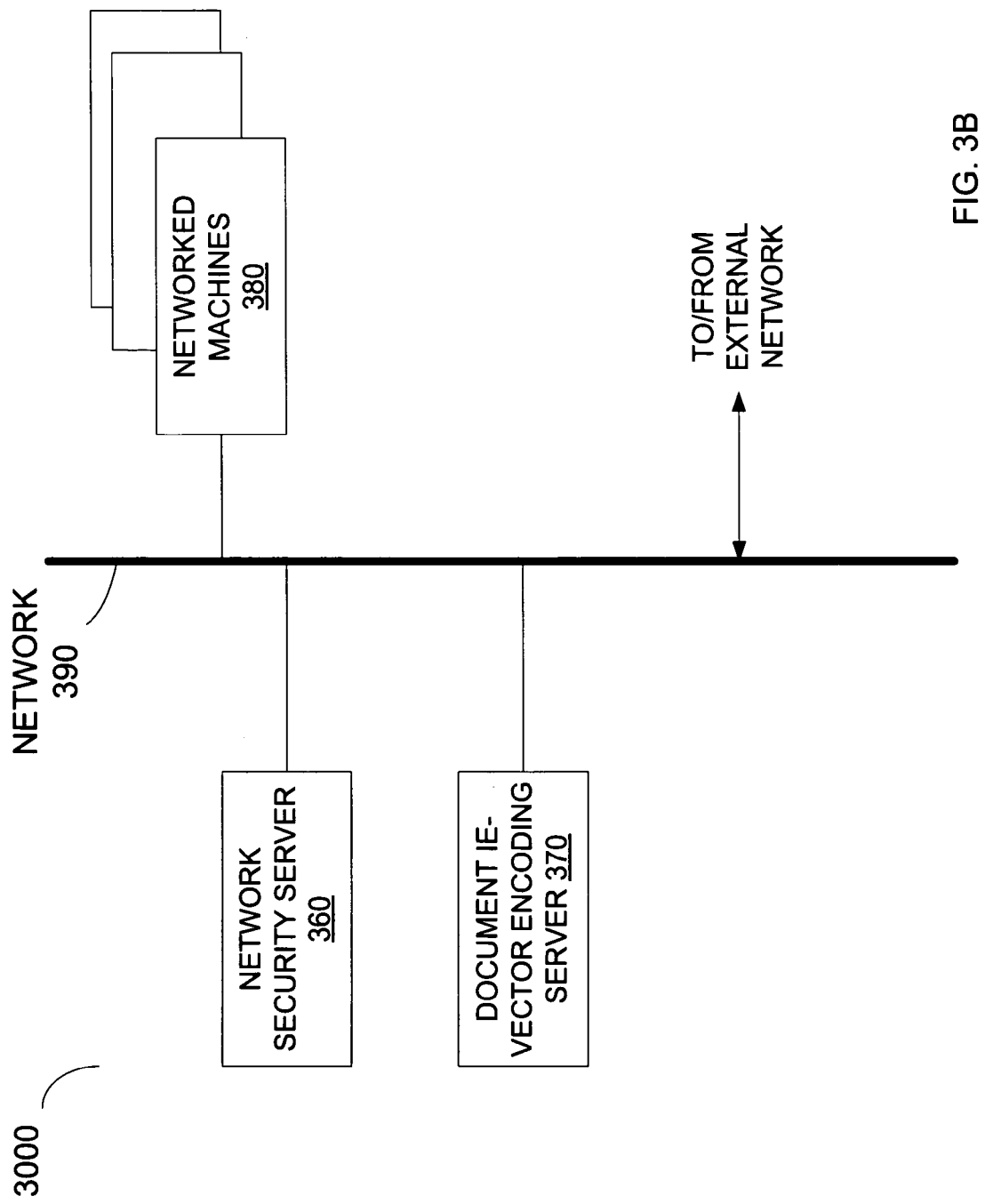
FIG. 3B illustrates an exemplary embodiment of a system in which embodiments of the present invention may be implemented.

FIG. 3B illustrates one embodiment of a system in which embodiments of the present invention may be implemented. The system 3000 includes a network security server 360, a document IE-vector encoding server 370, a number of networked machines 380, and a network 390, which are communicatively coupled to each other via the network 390. The network 390 is typically a network used by an entity (e.g., a company, a government, etc.). Furthermore, the network 390 may include different types of network, such as local area network (LAN), personal area network (PAN), wide area network (WAN), virtual private network (VPN), wireless network, wirelined network, etc.

To protect the system 3000 against data leak or data extrusion, the network security server 360 uses the document IE-vector encoding server 370 to generate a DNA sequence for documents in the system 3000. The network security server 360 and the document IE-vector encoding server 370 may be implemented using one or more computer systems, such as the one shown in FIG. 4. A functional block diagram of one embodiment of the document IE-vector encoding server 370 is shown in FIG. 3A. Details of some embodiments of DNA generation and the usage of DNA sequence of documents in data extrusion prevention have been discussed above.

In some embodiments, the networked machines 380 may include different types of devices, such as desktop personal computers (PCs), laptop PCs, personal digital assistants (PDAs), smart phones, special purpose devices (e.g., ordering devices in a point of sale system, etc.), etc. Some of the networked machines 380 may implement a relational database management system (RDBMS), such as Oracle®, Sybase®, Microsoft® SQL (MS-SQL), IBM® DB2, etc. Some of the networked machines 380 may implement a data storage system for storing data. One example of the data storage system adopts a network attached storage (NAS) configuration, which may further include a file server implemented in the form of an appliance, called a filer, attached to the network 390. Some of the networked machines 380 may implement an application server dedicated to executing one or more applications and/or a mail server. An application as used herein broadly refers to a program or a suite of programs executable by one or more processors to perform tasks and/or functions. The mail server is a server generally used for receiving, sending, and/or routing electronic communications (e.g., electronic mail) between different machines, which may include machines external to the system 3000.

Note that any or all of the components and the associated hardware illustrated in FIG. 3B may be used in various embodiments of the system 3000. However, it should be appreciated that other configurations of the system 3000 may include more or fewer devices than those shown in FIG. 3B. For example, there may be additional servers and/or client machines coupled to the network 390 than those shown in FIG. 3B.

Figure 4:
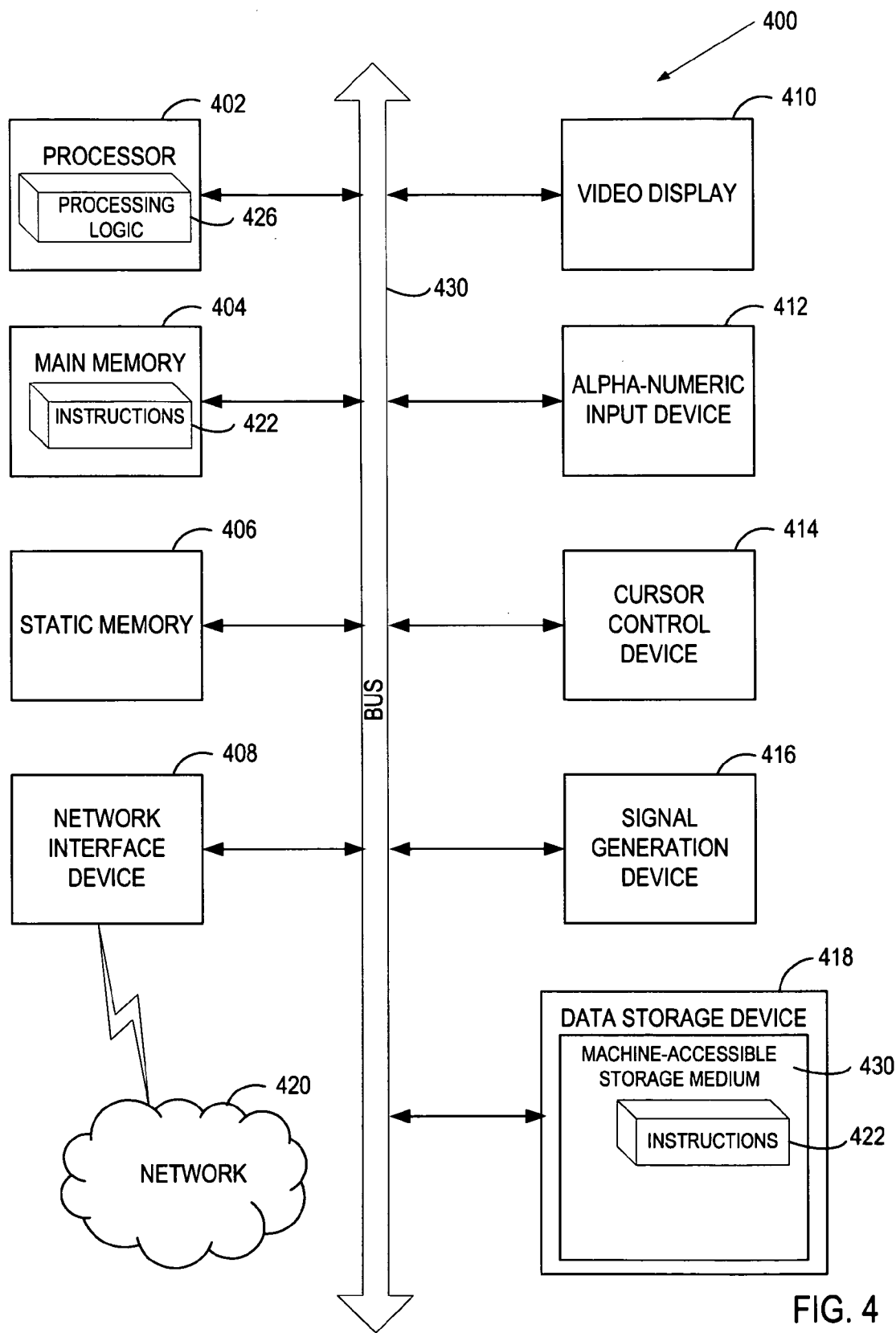
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a PC, a tablet PC, a set-top box (STB), a PDA, a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a high-accuracy document information element-vector (IE-vector) encoding server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
applying finite state automaton (FSA) to parse a document to identify one or more information elements (IEs) in the document;
deriving a unique symbolic sequence particular to the document based on the one or more IEs contained in the document, such unique symbolic sequence being analogous to the DeoxyriboNucleic Acid (DNA) sequence in animals and/or plants;
wherein deriving the unique symbolic sequence particular to the document comprises:
if an IE of the one or more IEs includes a section of free text, determining a term frequency inverted document frequency (tfidf) of each of a plurality of words in the section of free text; and
using the tfidf to generate a portion of the DNA sequence; and
applying reduced concept space (RCS) to the one or more IEs, wherein the RCS includes polysemic analysis and synomemic analysis.

2. The method of claim 1, further comprising:
recursively analyzing each of the one or more IEs to identify one or more embedded IEs within a corresponding IE.

3. The method of claim 1, wherein each of the one or more IEs includes a basic building block that encapsulates a predetermined type of information.

4. The method of claim 3, wherein a type of each of the one or more IEs includes at least one of: free text, a table, a spreadsheet, a figure, an image, a field, a header, a footer, a footnote, an index, a glossary, and a table of content.

5. The method of claim 3, wherein the type of each of the one or more IEs is associated with a predefined data schema.

6. The method of claim 1, further comprising:
creating an IE-map to graphically represent the document based on the one or more IEs, wherein a structure of the IE-map corresponds to a structure of the document.

7. An apparatus comprising:
a finite state machine to parse a document to identify one or more information elements (IEs) in the document;
a DeoxyriboNucleic Acid (DNA) generator coupled to the finite state machine to derive a DNA sequence of the document based on the one or more IEs;
wherein if an IE of the one or more IEs includes a section of free text, then the DNA generator determines a term frequency inverted document frequency (tfidf) of each of a plurality of words in the section of free text; and the DNA generator further uses the tfidf to generate a portion of the DNA sequence; and
a reduced concept space (RCS) processor coupled to the finite state machine, the RCS processor further comprising a polysemic analysis module and a synomemic analysis module.

8. The apparatus of claim 7, wherein the finite state machine is operable to recursively analyze each of the one or more IEs to identify one or more embedded IEs within a corresponding IE.

9. The apparatus of claim 7, further comprising:
a graph processing module to create an IE-map to graphically represent the document based on the one or more IEs, wherein a structure of the IE-map corresponds to a structure of the document.

10. The apparatus of claim 7, wherein a type of each of the one or more IEs includes at least one of free text, a table, a spreadsheet, a figure, an image, a field, a header, a footer, a footnote, an index, a glossary, and a table of content.

11. A system comprising the apparatus of claim 7, further comprising:
a network; and
a network security server communicatively coupled to the network, the network security server operable to use the DNA generator and the finite state machine to process each of a plurality of documents to be sent out from the network, and the network security server comprising a data extrusion prevention module to dynamically apply a data extrusion prevention policy to a respective document based on a corresponding DNA sequence generated.

12. The system of claim 11, further comprising:
a database to store DNA sequences of a plurality of predetermined documents.

\* \* \* \* \*